July 27, 1954

E. KLETT 2,685,042

INSULATED ELECTRIC POWER TOOL

Filed April 27, 1953

INVENTOR
ERICH KLETT
BY

July 27, 1954  E. KLETT  2,685,042
INSULATED ELECTRIC POWER TOOL
Filed April 27, 1953  4 Sheets-Sheet 2

INVENTOR
ERICH KLETT
BY:

July 27, 1954

E. KLETT 2,685,042

INSULATED ELECTRIC POWER TOOL

Filed April 27, 1953

INVENTOR.
ERICH KLETT
BY

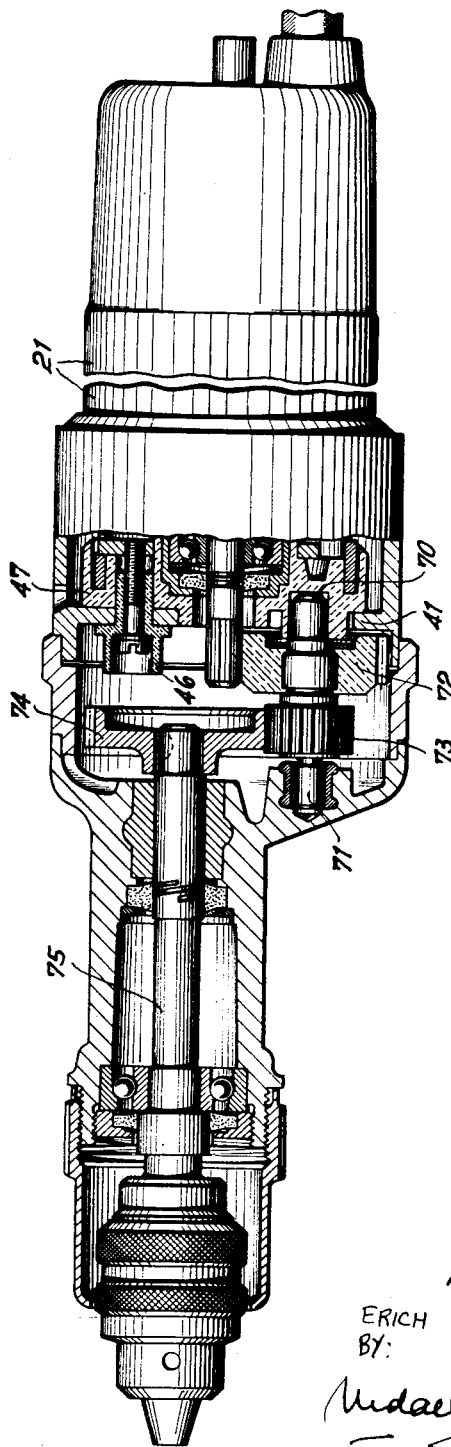

Patented July 27, 1954

2,685,042

UNITED STATES PATENT OFFICE 2,685,042

INSULATED ELECTRIC POWER TOOL

Erich Klett, Stuttgart-Bad Cannstatt, Germany, assignor to Robert Bosch G. m. b. H., Stuttgart, Germany Application April 27, 1953, Serial No. 351,111

Claims priority, application Germany April 30, 1952

11 Claims. (Cl. 310—50)

The present invention relates to electric motor devices.

More particularly the invention relates to insulated electric power hand tools.

In the operation of electric tools there is the danger that, due to the insulation of the windings or of other parts of the electric tool which conduct the electric current becoming defective, the service voltage in the tool reaches metallic parts exposed on the outside of the tool, and serious accidents may be caused when the service voltage exceeds a safe limit.

It is an object, therefore, of the present invention to provide a device of the above type which is completely insulated against contact with parts thereof which may carry excessively high voltage.

Another object of the present invention is to provide an electric power tool having metallic supporting and constructional parts so as to give necessary strength thereto, and at the same time provide insulating means for the device so arranged that the insulating parts are not subject to mechanical stress and do not affect the proper operation of the electric motor of the tool.

A further object of the present invention is to provide a device of the above type which is effectively insulated and adapted to be used for various different operations.

With the above objects in view, the present invention comprises in an electric power tool, in combination, metallic supporting means, an electric motor aranged with one end adjacent to the metallic supporting means, insulation means between the one end of the electric motor and the metallic supporting means, separating and electrically insulating the electric motor from the supporting means, and insulated attaching means securing the electric motor at the one end to the metallic supporting means with the insulation means in position between the electric motor and the metallic supporting means.

A preferred embodiment of the present invention includes an insulating sheath for the electric motor enclosing the sides thereof and its end remote from the metallic supporting means.

In a particular form of the device, the insulation means is formed of a disc-shaped insulating member mounted on a transverse wall of the metallic supporting means, the insulating member being centered on the transverse wall and having means for centering the electric motor thereon. In the present device the insulating member is clamped between the electric motor and the metallic support therefor, so that it is effectively held in position without being subject to tensile stress which might cause it to break.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the acompanying drawings, in which:

Fig. 5 shows an electrical hand drilling tool embodying the present invention, the view being partly in section.

Figure 1:
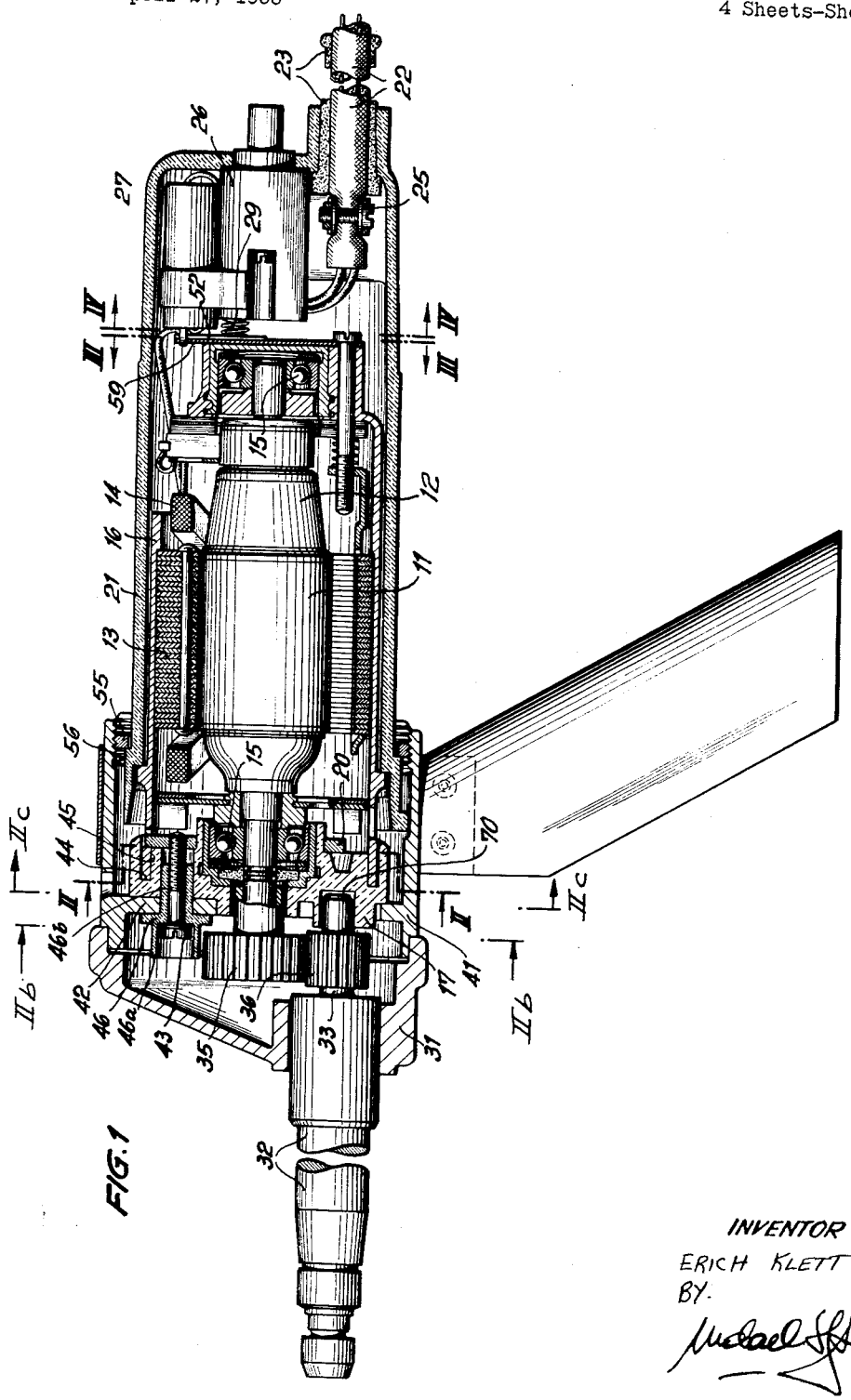
Fig. 1 shows in longitudinal section an electrical hand grinding tool according to the present invention.
Figure 2:
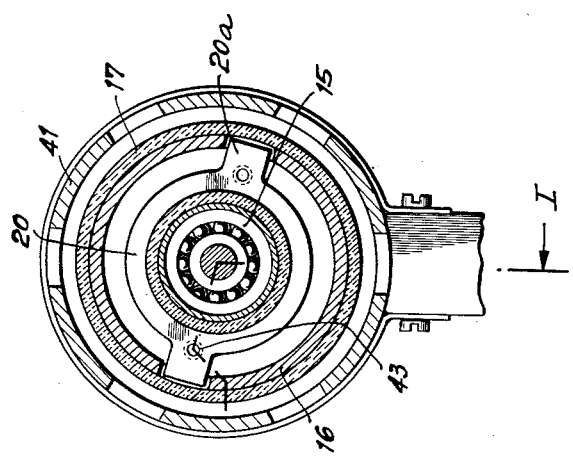
Fig. 2 is a transverse section along the line II—II of Fig. 1.

Referring now to the drawings, and particularly to Fig. 1, the hand grinding tool shown in Fig. 1 includes an electric motor 11, an insulating sheath 21 covering the motor, a gear casing 31 to which a tool spindle sleeve 32 having a grinding spindle 33 mounted therein is secured, and a tubular supporting member 41 which supports the whole machine and is used as a connecting member for its main parts. Gear casing 31 is attached to supporting member 41 by screws 31a—31b (see Fig. 2a). Supporting member 41 is cast from light metal and consists of a cylindrical tube open at both ends and having a perforated transverse wall 42. Due to the cylindrical wall of supporting member 41, which is of substantial length in comparison with its diameter, and to the transverse wall 42, which extends diametrically across supporting member 41, a very high degree of rigidity of the supporting member is obtained, in spite of its extremely light weight. Such a high degree of rigidity is necessary because the electric motor 11 is connected to the supporting member only at one end thereof, and is supported only slightly, if at all, on the insulating sheath 21 which is fitted around it. The electric motor 11 may also be dismantled, so that it forms in its dismantled condition a complete unit fully capable of operation, since the various essential constructional elements of the motor, i. e., the stator assembly 13 with its field windings 14 and the armature 12 together with its bearings 15 mounted on the ends of the armature shaft are held assembled in a rigid casing 16 which supports the elements of the motor.

Figures 2C, 2D:
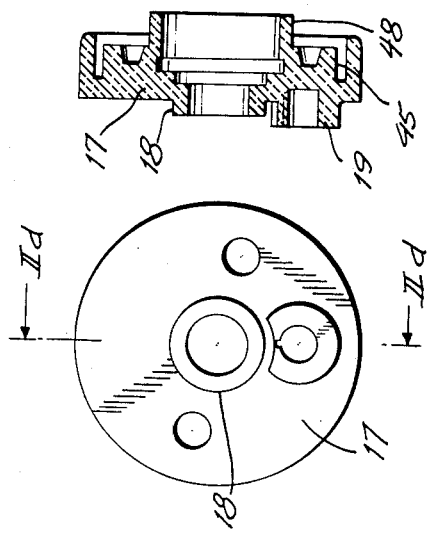
Fig. 2c is a view of the insulating member along the line IIc—IIc of Fig. 1.
Fig. 2d is a sectional view of the insulating member taken along the line IId—IId of Fig. 2c.
Figure 2B:
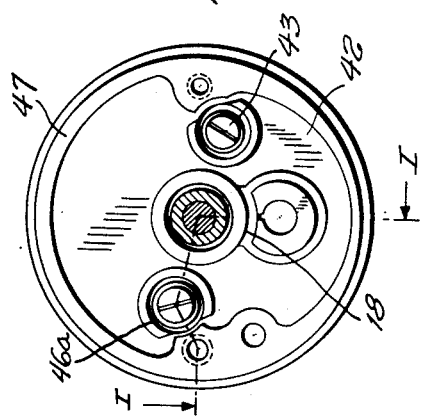
Fig. 2b is a transverse section along the line IIb—IIb of Fig. 1.
Figure 2A:
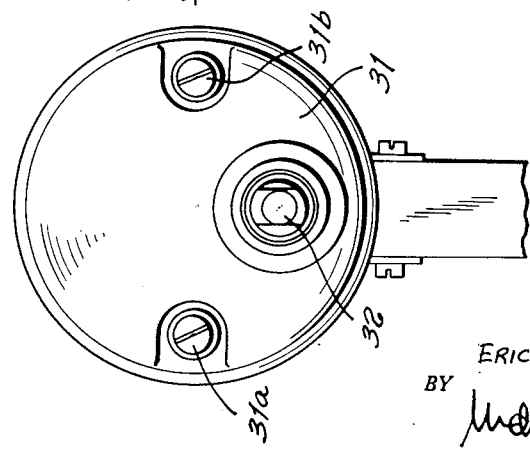
Fig. 2a is an end view of the device of Fig. 1 taken from the gear casing end.

The bearing plate 17 of compressed insulating material mounted on the driving side of the motor is used simultaneously as an insulating member between the motor casing 16 and the supporting member 41, against which the motor 11 is clamped by means of insulated tension bolts 43 and a clamping plate 20 inserted into the motor casing, so that the insulating parts subject to driving forces are stressed only by pressure between the motor casing 16 and the supporting member 41. As shown in Fig. 2d, member 17 has a collar 18, which engages the transverse wall 42 to center the member 17 thereon, and a recess 19 serving as a gear shaft bearing.

The tension bolts 43 are enclosed around the greatest part of their length by insulated bushings 46. The head portion 46a of the insulating bushing projects axially of the bushing so that the heads of the screws 43 lie therein inwardly of the outer edge and may, if desired, be covered with sealing material. The hollow shaft 46b of the insulating bushings is offset relative to the head part 46a, and is of such diameter that it fits tightly in the bores of transverse wall 42 of supporting member 41 and in the insulating member 17.

The insulating member 17 has a relatively deep annular groove 44 on its surface facing away from transverse wall 42, the groove extending around the surface near the periphery of the insulating member 17. As shown in Fig. 1, casing 16 is arranged with its edge inserted within groove 44, the groove thus serving to center the casing on the insulating member, while the outer surface of the annular groove 44 covers the edge of the casing 16. To securely hold casing 16 to the transverse wall 42, a stiff clamping plate 20 is provided, the plate being of an annular form having radially extending projections 20a which are inserted in slots in the casing 16 near the end thereof, as is more clearly shown in Fig. 2. Tension bolts 43 are screwed into the clamping plate 20 with the heads of the bolts bearing against transverse wall 42, through bushing 46, on the opposite side thereof from said clamping plate, so that a tightening of bolts 43 serves to draw casing 16 and the electric motor supported thereby against insulating member 17 to clamp the latter against transverse wall 42. Clamping plate 20 is secured against radial displacement by a concentric projection 48 on the insulating member 17, on which the plate 20 is arranged.

Figure 4:
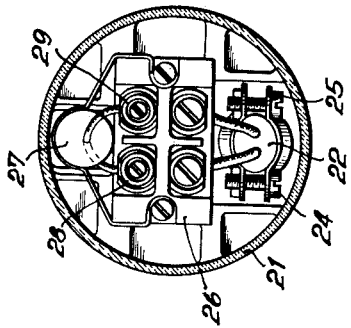
Fig. 4 is a transverse section along the line IV—IV of Fig. 1.

The insulating sheath 21 fitted over electric motor 11 may be used as a handle for the electric tool, and consists of a synthetic material which is, for all practical purposes, unbreakable, and which is known under the name "Polyamide" or "Ultraamide" and is formed by molding in the usual manner. In order to obtain sufficient elasticity and strength, the formed sheaths are immersed for several hours in water, preferably in hot water with a glycerine addition of about 5–25%. An extremely strong sheath of insulating material is thereby produced, and to the sheath are connected all the parts which are necessary for the electrical connection of the motor. These include, as shown in Fig. 1, one end of the connecting cable 22, which is drawn into the insulating sheath together with a cable sleeve 23 and is held firm by means of clamping clips 24 and 25, more clearly shown in Fig. 4, and a reversing switch 26 on which an anti-interference condenser 27 and contact springs 28 and 29 are mounted.

Figure 3:
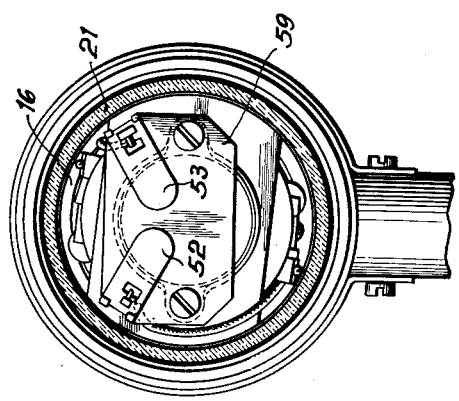
Fig. 3 is a transverse section along the line III—III of Fig. 1.

When assembling the parts in insulating sheath 21, the contact springs 28 and 29 are arranged against two contact strips 52 and 53 (see Fig. 3), which are disposed on an insulating plate 59 on the face of the motor support casing 16 facing towards the switch and thereby form an electrical connection between the motor and the leads of the main cable 22, provided the switch 26 is turned on. By this arrangement, the motor is automatically disconnected from the main voltage supply as soon as the insulating sheath 21 is removed and the electrically conductive parts are exposed.

For securing the insulating sheath 21 in position over the motor, a screw ring 55 is provided, the inner diameter of which is only slightly greater than the outer diameter of insulating sheath 21, the screw ring 55 being arranged in engagement with threaded portion 56 of supporting member 41 in abutment with an external ridge formed on insulating sheath 21, so that screw ring 55, when screwed into the tubular support member 41, clamps the insulating sheath 21 against a complementary ridge on the exterior of casing 16, to thereby hold the insulating sheath securely in supporting member 41.

In the form of construction shown in Fig. 5, as applied to an electric hand drilling machine, the same principal parts are used for the motor and its insulating parts as in the case of the above described hand grinding device. By virtue of the constructional arrangement employed, it is possible to adapt the machine for different intended operations merely by fitting a different type of gear casing to the end of the electric tool, as illustrated by Figs. 1 and 5. Thus, the hand drilling machine shown in Fig. 5 differs from the previously described hand grinding tool merely by its gear head shaped for drilling purposes. The gear casing of the device shown in Fig. 5 contains a reduction gear shaft 71 on which a gear wheel 72 of insulating material is mounted to engage with the motor shaft pinion, and on which shaft a smaller gear wheel 73 is also secured for engagement with the larger gear wheel 74 mounted on the drill spindle 75. One end of the shaft of the reduction gear is mounted in the face wall of the gear head, the other end of the shaft being inserted in a bore 70 in the insulating member 47.

The insulating gear wheel 72 may be formed by laminations of fabric strips saturated with synthetic resin which have been compressed together, the gear wheel being provided on its periphery with gear teeth cut by a gear milling machine.

Instead of the drill head or gear casing 31 mentioned, there may, of course, also be mounted on the supporting member other forms of gear head for other purposes of use, as, for example, angle drill heads, screwdriver heads and the like, with a gear reduction or transmission mechanism adapted to the desired purpose of use on the same supporting member 41 for all types of machines. Thus a very much simplified manufacture is possible, giving a wide range of various machines, but requiring few differing replacement parts.

The insulating arrangement described is capable of withstanding the roughest operation, and therefore offers a secure protection against contact by the operator with live electrical parts, especially since the insulating parts are mechanically stressed only by pressure on them, and are not subject to tensile stresses.

It will be understood that each of the elements described above, or two or more together, may also find a useful application in other types of electric motor devices differing from the types described above.

While the invention has been illustrated and described as embodied in electric power hand tools, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an electric power tool, in combination, metallic supporting means; an electric motor having an outer casing and having a central armature shaft and an outer casing arranged with one end adjacent to said metallic supporting means; an insulating member between said one end of said electric motor and said metallic supporting means, separating and electrically insulating said electric motor from said supporting means, said insulating member being formed with an aperture and with an annular groove on the surface thereof facing said electric motor for engaging, respectively, said armature shaft and said outer casing for centering the electric motor thereon; insulated attaching means including insulated screw means and an annular plate engaging said casing of said electric motor and bearing against said insulating member, said insulated screw means clamping said annular plate to said metallic supporting means with said insulating member in position between said electric motor and said metallic supporting means; and an insulating sheath for said electric motor, said insulating sheath being secured to said metallic support means and enclosing the sides and the other end of said electric motor overlying the outer casing thereof whereby said electric motor is electrically insulated from its support and shielded from direct contact.

2. In an electric power tool, in combination, metallic supporting means including a tubular housing member, said housing member being provided with a transverse wall extending diametrically across the interior thereof; an electric motor arranged wtih one end in said tubular housing member on one side of said transverse wall; a disc-shaped insulating member mounted on said transverse wall of said housing member between said one end of said electric motor and said transverse wall, separating and electrically insulating said electric motor from said supporting means; and insulated attaching means securing said electric motor at said one end to said metallic supporting means with said insulating member in position between said electric motor and said metallic supporting means.

3. In an electric power tool, in combination, metallic supporting means including a tubular housing member, said housing member being provided with a transverse wall extending diametrically across the interior thereof; an electric motor having a central armature shaft and an outer casing arranged with one end in said tubular housing member on one side of said transverse wall; a disc-shaped insulating member mounted on said transverse wall of said housing member between said one end of said electric motor and said transverse wall, separating and electrically insulating said electric motor from said supporting means, said insulating member being formed with an aperture and with an annular groove on the surface thereof facing said electric motor for engaging, respectively, said armature shaft and said outer casing for centering the electric motor thereon; and insulated attaching means securing said electric motor at said one end to said metallic supporting means with said insulating member in position between said electric motor and said metallic supporting means.

4. In an electric power tool, in combination, metallic supporting means including a tubular housing member, said housing member being provided with a transverse wall extending diametrically across the interior thereof; an electric motor having an outer casing and arranged with one end in said tubular housing member on one side of said transverse wall, said casing being formed with slots therein at its end adjacent the transverse wall of said tubular housing member; a disc-shaped insulating member mounted on said transverse wall of said housing member between said one end of said electric motor and said transverse wall, separating and electrically insulating said electric motor from said supporting means; and insulated attaching means including insulated screw means and an annular plate having radial projections engaging said slots in said casing of said electric motor and bearing against said insulation means, said insulated screw means engaging said annular plate and said transverse wall for clamping said annular plate to said transverse wall and thereby clamping said insulating member in position between said electric motor and said metallic supporting means.

5. In an electric power tool, in combination, metallic supporting means including a tubular housing member, said housing member being provided with a transverse wall extending diametrically across the interior thereof, said metallic supporting means having a gear casing mounted on said tubular housing enclosing the same on one side of said transverse wall, said gear casing adapted to support a gear shaft therein; an electric motor arranged with one end in said tubular housing member on the opposite side of said transverse wall; a disc-shaped insulating member mounted on said transverse wall of said housing member in contact with said opposite side thereof between said one end of said electric motor and said transverse wall, separating and electrically insulating said electric motor from said supporting means, said insulating member having a projection extending through said transverse wall into said gear casing and defining a bearing recess adapted to receive the gear shaft in said gear casing; and insulated attaching means securing said electric motor at said one end to said metallic supporting means with said insulating member in position between said electric motor and said metallic supporting means.

6. In an electric power tool, in combination, metallic supporting means including a tubular housing member, said housing member being provided with a transverse wall extending diametrically across the interior thereof; an electric motor having an outer casing and arranged with one end in said tubular housing member on one side of said transverse wall, said casing being formed with slots therein at its end adjacent the transverse wall of said tubular housing member; a disc-shaped insulating member mounted on said transverse wall of said housing member between said one end of said electric motor and said transverse wall, separating and electrically insulating said electric motor from said supporting means and covering the edge of said casing and said slots therein; and insulated attaching means including insulated screw means and an annular plate having radial projections engaging said slots in said casing of said electric motor and bearing against said insulation means, said insulated screw means engaging said annular plate and said transverse wall for clamping said annular plate to said transverse wall and thereby clamping said insulating member in position between said electric motor and said metallic supporting means.

7. In an electric power tool, in combination, metallic supporting means including a tubular housing member, said housing member being provided with a transverse wall extending diametrically across the interior thereof and formed with a threaded portion at its end; an electric motor having an outer casing arranged with one end in said tubular housing member on one side of said transverse wall, said casing having an annular external projection; a disc-shaped insulating member mounted on said transverse wall of said housing member between said one end of said electric motor casing and said transverse wall, separating and electrically insulating said electric motor from said metallic supporting means; insulated attaching means securing said electric motor and its casing at said one end thereof to said transverse wall clamping said insulating member in position between said electric motor and said transverse wall; an insulating sheath for said electric motor overlying said casing thereof and enclosing its sides and its other end, said insulating sheath being formed with internal and external ridge portions and being inserted with one end extending into said tubular housing member with said internal ridge portion engaging said external projection of said casing; and annular threaded securing means encircling said sheath engaging its external ridge portion and screwed into said threaded portion of said tubular housing member for releasably securing said sheath to said tubular housing member, whereby said electric motor is electrically insulated from its support and shielded from direct contact.

8. An electric power hand tool, comprising, in combination, a metallic tubular support member having a transverse wall intermediate its ends extending diametrically across the interior of said tubular support member, said transverse wall being formed with at least a central aperture; a gear casing secured to said tubular support member on one side of said transverse wall covering one end of said tubular support member; a disc-shaped insulating member mounted on said transverse wall on the opposite side thereof, said insulating member being formed with a central opening and a collar portion surrounding said opening, said collar portion being arranged in said central aperture of said transverse wall engaging the edges thereof, so as to center said insulating member on said transverse wall; an electric motor having an outer supporting casing and an armature shaft, arranged with one end extending into said tubular support member on said opposite side of said transverse wall adjacent said insulating member, said armature shaft projecting through said central opening of said insulating member and said central aperture of said transverse wall; and insulated attaching means holding said electric motor casing to said transverse wall with said insulating member in position therebetween.

9. An electric power hand tool, comprising, in combination, a metallic tubular support member having a transverse wall intermediate its ends extending diametrically across the interior of said tubular support member, said transverse wall being formed with at least a central aperture; a gear casing secured to said tubular support member on one side of said transverse wall covering one end of said tubular support member; a disc-shaped insulating member mounted on said transverse wall on the opposite side thereof, said insulating member being formed with a central opening and a collar portion surrounding said opening, said collar portion being arranged in said central aperture of said transverse wall engaging the edges thereof, so as to center said insulating member on said transverse wall, said insulating member being formed on the surface thereof facing away from said transverse wall with an annular groove near its periphery; an electric motor having an outer supporting casing and an armature shaft, arranged with one end extending into said tubular support member on said opposite side of said transverse wall adjacent said insulating member, said armature shaft projecting through said central opening of said insulating member and said central aperture of said transverse wall, the edge of said casing projecting into said annular groove in said insulating member, so as to center said electric motor thereon; and insulated attaching means holding said electric motor casing to said transverse wall and clamping said insulating member in position therebetween.

10. An electric power hand tool, comprising, in combination, a metallic tubular support member having a transverse wall intermediate its ends extending diametrically across the interior of said tubular support member, said transverse wall being formed with at least a central aperture; a gear casing secured to said tubular support member on one side of said transverse wall covering one end of said tubular support member; a disc-shaped insulating member mounted on said transverse wall on the opposite side thereof, said insulating member being formed with a central opening and a collar portion surrounding said opening, said collar portion being arranged in said central aperture of said transverse wall engaging the edges thereof, so as to center said insulating member on said transverse wall; an electric motor having an outer supporting casing and an armature shaft, arranged with one end extending into said tubular support member on said opposite side of said transverse wall adjacent said insulating member, said armature shaft projecting through said central opening of said insulating member and said central aperture of said transverse wall; insulated attaching means holding said electric motor casing to said transverse wall with said insulating member in position therebetween; and an insulating sheath for said electric motor, said insulating sheath being secured at its end to said tubular support member and enclosing the sides and the other end of said electric motor overlying the outer casing thereof, whereby said electric motor is electrically insulated from said tubular support member and shielded from direct contact.

11. An electric power hand tool, comprising, in combination, a metallic tubular support member having a transverse wall intermediate its ends extending diametrically across the interior of said tubular support member, said transverse wall being formed with at least a central aperture; a gear casing secured to said tubular support member on one side of said transverse wall covering one end of said tubular support member; a disc-shaped insulating member mounted on said transverse wall on the opposite side thereof, said insulating member being formed with a central opening and a collar portion surrounding said opening, said collar portion being arranged in said central aperture of said transverse wall engaging the edges thereof, so as to center said insulating member on said transverse wall, said insulating member being formed on the surface thereof facing away from said transverse wall with an annular groove near its periphery; an electric motor having an outer supporting casing and an armature shaft, arranged with one end extending into said tubular support member on said opposite side of said transverse wall adjacent said insulating member, said armature shaft projecting through said central opening of said insulating member and said central aperture of said transverse wall, the edge of said casing projecting into said annular groove in said insulating member, so as to center said electric motor thereon; insulated attaching means holding said electric motor casing to said transverse wall and clamping said insulating member in position therebetween; and an insulating sheath for said electric motor, said insulating sheath being secured at its end to said tubular support member and enclosing the sides and the other end of said electric motor overlying the outer casing thereof, whereby said electric motor is electrically insulated from said tubular support member and shielded from direct contact.

References Cited in the file of this patent

FOREIGN PATENTS

| Number | Country | Date |
|--------|---------|------|
| 404,477 | Great Britain | Jan. 18, 1934 |
| 785,053 | France | May 13, 1935 |